United States Patent [19]

Mohn

[11] Patent Number: 5,701,797

[45] Date of Patent: Dec. 30, 1997

[54] SEALING SYSTEM

[75] Inventor: Frank Mohn, London, United Kingdom

[73] Assignee: Framo Engineering AS, Nesttun, Norway

[21] Appl. No.: 532,652

[22] PCT Filed: Apr. 13, 1994

[86] PCT No.: PCT/GB94/00779

§ 371 Date: Nov. 29, 1995

§ 102(e) Date: Nov. 29, 1995

[87] PCT Pub. No.: WO94/24468

PCT Pub. Date: Oct. 27, 1994

[30] Foreign Application Priority Data

Apr. 15, 1993 [GB] United Kingdom ............... 93 07775

[51] Int. Cl.$^6$ ........................................... F15B 21/04
[52] U.S. Cl. ..................... 92/80; 92/82; 92/111; 92/112; 92/160; 184/24; 417/431
[58] Field of Search .................... 92/80, 82, 87, 92/156, 157, 158, 159, 160, 181 R, 112, 111; 184/24, 5; 417/431

[56] References Cited

U.S. PATENT DOCUMENTS

| | | | |
|---|---|---|---|
| 748,916 | 1/1904 | Bonnechose | 92/159 |
| 2,545,506 | 3/1951 | Walsh | 417/431 X |
| 3,168,013 | 2/1965 | Williamson | 92/160 X |
| 3,216,334 | 11/1965 | Bauer | 92/157 X |
| 3,602,613 | 8/1971 | Gunther et al. | 92/156 X |
| 4,229,011 | 10/1980 | Wikelski et al. | 92/156 X |
| 4,472,111 | 9/1984 | Yamatani | 92/153 X |
| 4,691,620 | 9/1987 | Kao | 92/80 |

FOREIGN PATENT DOCUMENTS

| | | | |
|---|---|---|---|
| 0 314 493 | 5/1989 | European Pat. Off. | |
| 2 127 062 | 10/1972 | France | |
| 2 399 593 | 3/1979 | France | |
| 316184 | 12/1919 | Germany | 92/87 |
| 1192777 | 5/1965 | Germany | 92/153 |
| 2710428 | 9/1978 | Germany | 92/87 |
| 724986 | 2/1955 | United Kingdom | 92/159 |

*Primary Examiner*—F. Daniel Lopez
*Attorney, Agent, or Firm*—Young & Thompson

[57] ABSTRACT

A piston reciprocally movable within a cylinder is sealed to the cylinder wall by fluid at a pressure greater than those of the fluids on the opposed sides of the piston supplied to the space (18) between two seals (19, 20) operative between the piston and cylinder wall, an accumulator or auxiliary intensifier chamber (67) being provided from which overpressure fluid is supplied to the space between the two seals to regulate the pressure between them. The two seals between the piston and the cylinder wall can be constituted respectively by first (19A–19C) and second (20A–20C) groups or pluralities of separate seal rings selected as regards material and dimensions so as to perform specific functions. Also, a sealing system between a piston and a cylinder within which the piston is reciprocally movable can comprise a forward seal (19, 20), conveniently having two seals or seal ring groups, separating a process or working fluid (4) being moved by the piston, from a second fluid (7) in the space around the piston, and a rearwardly spaced barrier seal (21A–21C) separating the second fluid from a third fluid filling a housing (6) containing a motor by which the piston is driven.

23 Claims, 4 Drawing Sheets

SEALING SYSTEM

The invention relates to sealing systems for members which are reciprocably movable within a cylinder.

In many types of equipment, a piston or like member is reciprocably movable in a cylinder, its two opposed sides being exposed to different fluid pressures. This pressure differential produces a tendency for leakage between the reciprocable member and the cylinder wall of fluid from the higher pressure side to the lower. Such leakage can be disadvantageous where the lower pressure fluid would be contaminated by admixture with the other, or where the other fluid contain abrasive material which needs to be excluded from the lower pressure fluid in order to protect other parts of the equipment with which that fluid is in communication.

The invention is accordingly concerned with the provision of an improved sealing system for a member reciprocably movable within a cylinder.

There is known from EP-A-0 314 493 an effective sealing system for a member reciprocably movable within a cylinder of the kind in which overpressure fluid, that is, fluid at a pressure greater than those of the fluids on the opposed sides of the member, is supplied to the space between two seals operative between the member and the cylinder wall. The overpressure of the fluid is obtained by constructing the reciprocable member in two portions capable of relative axial movement, the portions defining an intensifier chamber between them into which fluid is drawn through non-return valve means on relative movement apart of the two portions and from which the fluid is urged into the space between the seals by movement of the portions together.

In accordance with a first aspect of the invention, there is provided, in a sealing arrangement of this kind, an accumulator or auxiliary intensifier chamber from which overpressure fluid is supplied to the space between the two seals when the pressure in the main intensifier chamber drops.

It will be evident that the pressure within the intensifier chamber varies during the cycle of movement of the two portions of the member, falling at the end of each stroke, thereby reducing the effectiveness of the sealing arrangement at critical times during the cycle. The provision of the auxiliary intensifier chamber in accordance with the invention provides a reserve overpressure which tends to regulate the effective fluid pressure in the space between the two seals.

A sealing system embodying the present invention thus conveniently includes passage means leading from the intensifier chamber to the accumulator and the space between the seals by way of a non-return valve permitting flow from the intensifier chamber only. Biassing means tending to reduce the volume of the accumulator is provided.

When the two portions of the reciprocable member are moving together during a compressive stroke, the accumulator is expanded by pressure fluid from the intensifier chamber. The pressure in this chamber then falls as the two portions of the member commence the return stroke, and the accumulator pressure is applied to the space between the seals, under the biassing means, the non-return valve isolating the space and the accumulator from the intensifier chamber.

In accordance with a second aspect of the invention, there is provided a sealing arrangement of the kind described in which the two seals between the member and the cylinder wall are constituted respectively by first and second groups or pluralities of separate seal rings.

The seal rings of the first and second groups of sealing rings, which are conveniently carried by the reciprocable member, are selected as regards material and dimensions so as to perform specific functions. Preferably, the seal ring located at the forward end of the reciprocable member is such as to prevent passage of particles in the process or working fluid to the next following seal ring or rings, so that the operating conditions for such ring or rings are improved. The forward seal ring can thus be a segmented ceramic ring or two such rings received in a common groove. The following ring or rings have, in addition to sealing, a scarping function and also an oil distribution function where the fluid to be isolated from the process fluid is a lubricating oil. The following ring or rings then allow sufficient lubricant to pass to the forward seal ring, whilst minimising the concentration of process fluid flowing in the opposite direction to the lubricant flow.

The second group of seal rings, rearward of the pressure intensifier outlet port, comprise two or more rings selected to have characteristics such as to minimise flow from the intensifier chamber away from the process fluid.

In accordance with a third aspect of the invention, there is provided, between a member and a cylinder within which the member is reciprocably movable, a sealing system comprising a forward seal separating a process or working fluid being moved by the member from a second fluid in the space around the member, and a rearwardly spaced barrier seal separating the second fluid from a third fluid.

Typically, the third fluid fills a housing containing a motor, for example, a linear electric motor, by which the reciprocable member is driven, and the second and third fluids can then be the same. The forward seal is preferably, but not necessarily, of the multiple seal ring kind described herein, advantageously, but not necessarily, in association with a pressure intensifier device of the kind described in EP-A-0 314 493, which can but need not include an accumulator also as described herein.

The barrier seal can comprise three seal rings spaced to define two chambers between them, of which the forward chamber communicates with a relatively high pressure fluid source, and of which the rear chamber is ventilated or evacuated or pressurized at a pressure lower than that in the forward chamber and that of the third fluid.

Although a piston pump, particularly if provided with a sealing mechanism in accordance with the first and second aspects of the invention, can operate satisfactorily in appropriate circumstances, there is a risk of pump or motor damage as a result of a single minor failure of the cylinder, the piston or the seal rings. This arises because large quantities of the process fluid could enter the motor housing undetected.

The barrier seal eliminates such problems. Coating failure or failure of the pressure intensifier mechanism can be detected immediately by monitoring flush fluid flow and pressure in the fluid feed line between the intensifier mechanism and the barrier seal. This trapped fluid here in case of any coating or piston failure reason will experience a pressure increase that can be sensed and used to effect a shut-down. In addition the oil flow to this area can be closely monitored. Thus the effect of the barrier seal is to give extremely good leakage rate control and its use consequently indicates a long performance before a possible pressure rise should take place.

The invention is further described below, by way of example, with reference to the accompanying drawings, in which.

In the drawings, like or functionally equivalent parts in different figures are designated by the same reference numerals. To facilitate understanding, spacing is shown between the various sealing means illustrated and one of the surfaces to which a seal is made in practice.

Figure 1:
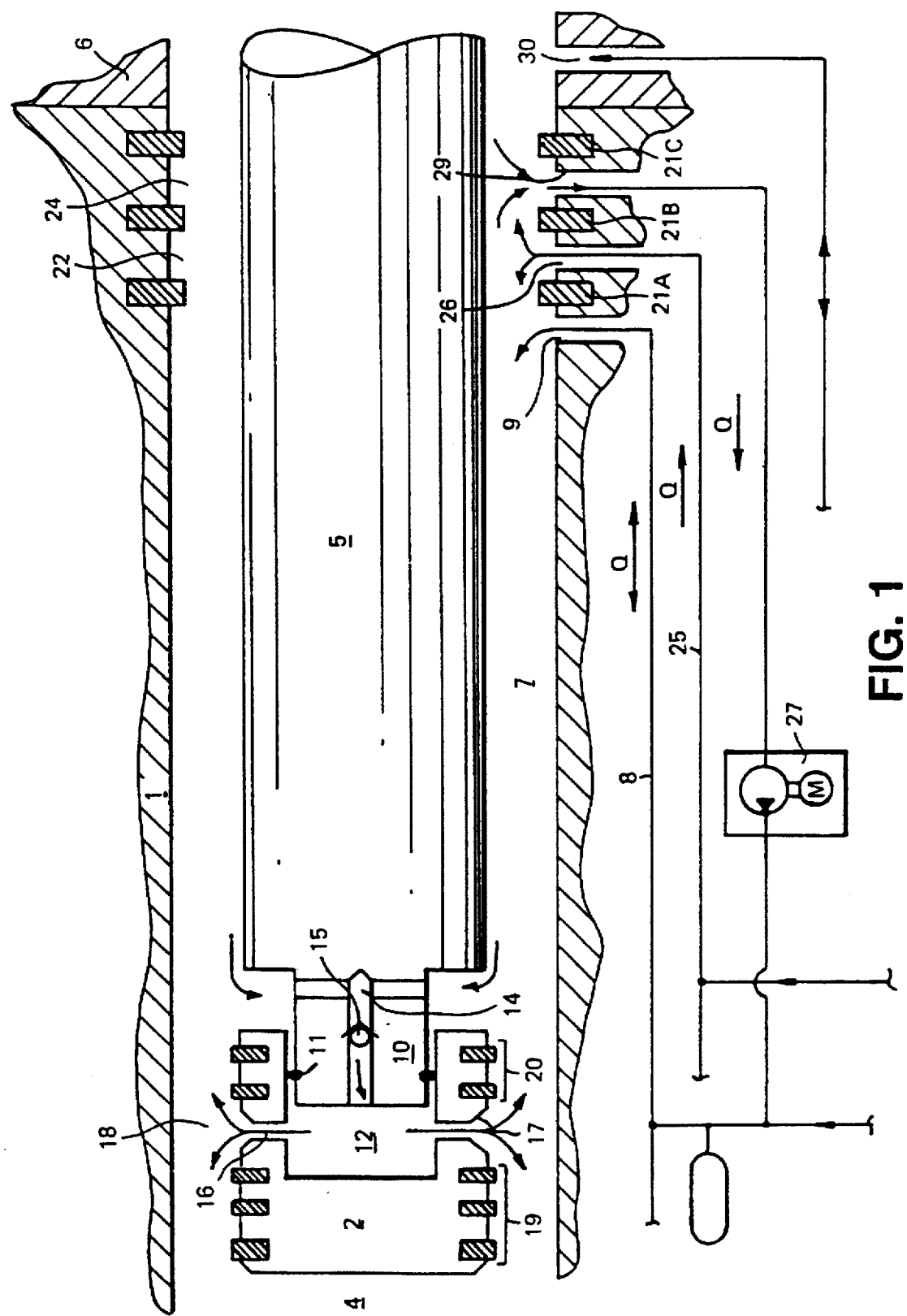
FIG. 1 is a schematic sectional side view of a piston pump embodying the present invention.

The piston pump shown in FIG. 1 comprises a cylinder 1 in which a piston head 2 is slidably received. To the left (as shown) of the piston head 2, the cylinder 1 provides a variable volume process or working chamber 4 associated with appropriate inlet and outlet valves (not shown) so that a process or working fluid is moved into and out of the chamber by reciprocal movement of the piston head 2.

The piston head 2 is reciprocably driven within the cylinder 1 by a piston rod 5 which extends to the right (as shown) into a motor housing 6, in which is received a prime mover (not shown) for effecting reciprocation of the piston rod. The prime mover can conveniently comprise a linear electric motor having a driving or stator winding on the motor housing wall co-operating with a driven winding carried by the piston rod. The piston rod 5 is spaced from the cylinder wall to provide a chamber 7 into which lubricant oil is fed from a supply source suitably pressurised by way of a feed line 8 through a port 9 in the cylinder wall at a position spaced away from the piston head.

The forward or driving end of the piston rod 5 has a reduced diameter end portion 10 received within a cylindrical recess formed at the adjacent end of the piston head 2, with an O-ring 11 or other suitable type of seal between the end portion and the wall of the recess. A variable volume intensifier or overpressure chamber 12 is thus formed between the piston head and the piston rod. A passage 14, comprising transverse portions in the piston rod end portion 10 adjacent the main body of the piston rod, and an axially extending portion, communicates lubricant oil in the feed chamber 7 with the intensifier chamber 12. A check or non-return valve 15 in the axial passage permits fluid flow into the chamber 12 but prevents return flow. Transverse passages 16 in the wall of the piston head 2 connect the chamber 12 to ports 17 at the exterior of the head. The ports 17 are located between an outer or forward group 19 of seal rings and an inner or rear group 20 of seal rings defining a space 18 between them, the piston head 2 and the cylinder 1.

During the working or discharge stroke, leftward movement of the piston rod 5 is transmitted to the piston head 2, by way of lubricant oil in the chamber 12. Because of the valve 15, the fluid is pressurised accordingly, so that intensified pressure or overpressure is communicated to the space 18 between the inner and outer groups 19,20 of seal rings through the transverse passages 16. Return movement of the piston rod 5 on the suction stroke reduces pressure within the chamber 12 and lubricant oil enters the chamber 12 through the passage 14 and the non-return Valve 15. Limited relative reciprocation of the piston head 2 and piston rod 5 consequently enhances the seal provided by the sealing groups 19,20.

The piston pump of FIG. 1 also incorporates a barrier seal system shown at the right-hand side of the figure which co-operates with the seal arrangements associated with the piston head 2.

The barrier seal system comprises three seal rings 21A, 21B & 21C located in grooves in the cylinder wall between the port 9 and the motor housing 6 and spaced to define forward and rear chambers 22 and 24 between them.

The chamber 22 between the seal rings 21A,21B communicates with a pressurised barrier fluid line 25 through a port 26 in the cylinder wall. The chamber 22 thus receives a barrier fluid, which can conveniently be the lubricant oil supplied to the feed chamber 7 through the port 9, but at a pressure greater than that in the lubricant oil feed line 8. The chamber 22 is thus pressurised to a greater pressure than either the feed chamber 7 and the rear barrier chamber 24 but a negative flow into the line 25 can occur due to the positive scoping function that takes place in chamber 22.

The chamber 24 is ventilated, or filled with gas at low pressure, this condition being maintained by vacuum or low pressure generated by a motor driven pump unit 27 supplied at a suction port 29 in the cylinder wall. Alternatively, the chamber 24 can be filled with the barrier fluid or oil at a lower pressure than prevails in the chamber 22 and in the motor housing 6.

The three barrier seal rings 21A, 21B & 21C thus act as barriers to eliminate any penetration of the process fluid into the motor housing 6. The separation of the barrier seal system from the motor housing 6, which is oil filled through a port 30 in the cylinder wall connecting to a feed line, prevents penetration into the motor housing 6 of any microfilm at the cylinder surface wall which may be contaminated by process fluid.

Use of a barrier seal system as illustrated affords a high degree of operational safety. The various seal rings employed can give 100% redundancy, and the risk of pollution by the process fluid is eliminated. The cylinder, piston and seals can be inspected, serviced or replaced without draining oil from the motor housing. In case of a piston failure, the pump can be run as plunger to avoid immediate shut-down. Production can continue until a planned service shut-down can be performed.

Figure 2:
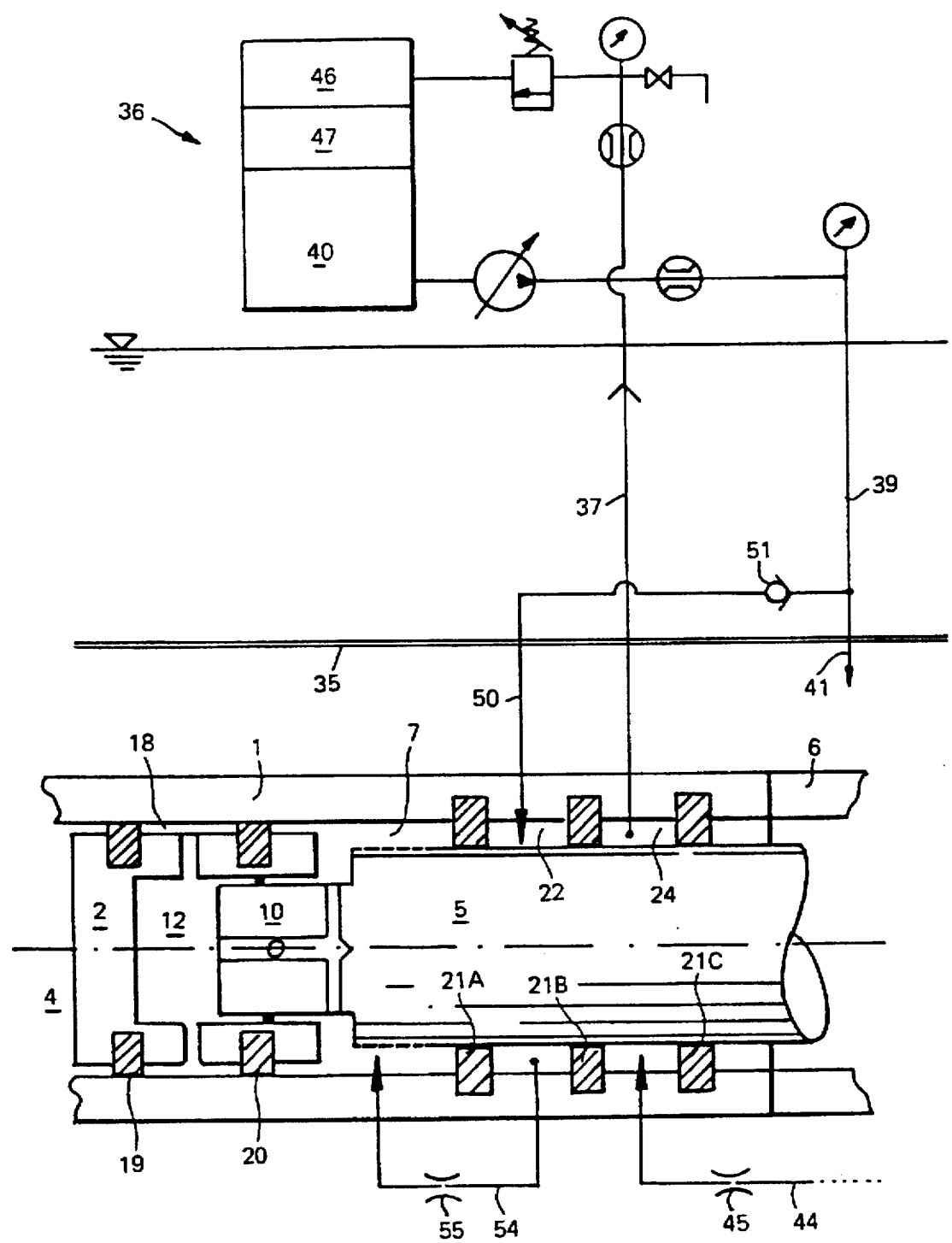
FIG. 2 is a schematic sectional side view of a piston pump similar to that of FIG. 1 but modified for subsea use.

The piston pump of FIG. 2 corresponds to that of FIG. 1 except for modifications appropriate to use as a sub-sea pump, for example in a fluid hydrocarbon extraction system. Only the modifications will be described.

The pump is received within a housing 35 forming part of a submerged installation connected to surface equipment indicated schematically at 36 by suitable supply and delivery lines including the illustrated lines 37 & 39. Single seal rings 19 & 20 replace the seal ring groups of FIG. 1.

By way of the line 39, barrier oil is conveyed from a supply source in the form of a reservoir 40 at the surface equipment 36 to the interior of the housing 35 at 41 and from the housing interior to the rear barrier chamber 24 through a passage 44 containing a restriction 45 which provides the required pressure differential across the seal ring 21c. The pump housing interior can communicate with the interior of the motor housing 6, from which the passage 44 can extend. By way of the line 37 the barrier oil is returned to a return compartment 46 at the surface equipment 36 from which the oil can re-enter the reservoir 40 by way of a flush compartment 47.

The line 39 also conveys the barrier oil to the forward chamber 22 through a branch line 50 including a non-return valve 51 to prevent back-flow from the chamber. The chamber 7 is fed from the chamber 22 through a passage 54 containing a restriction 55 providing a pressure differential between the chambers and across the seal ring 21B. The arrangements illustrated and described make it possible to assess the quantity of barrier oil flowing into the process fluid, by monitoring the flow and return of the barrier oil through lines 39 & 37 respectively.

Figure 3:
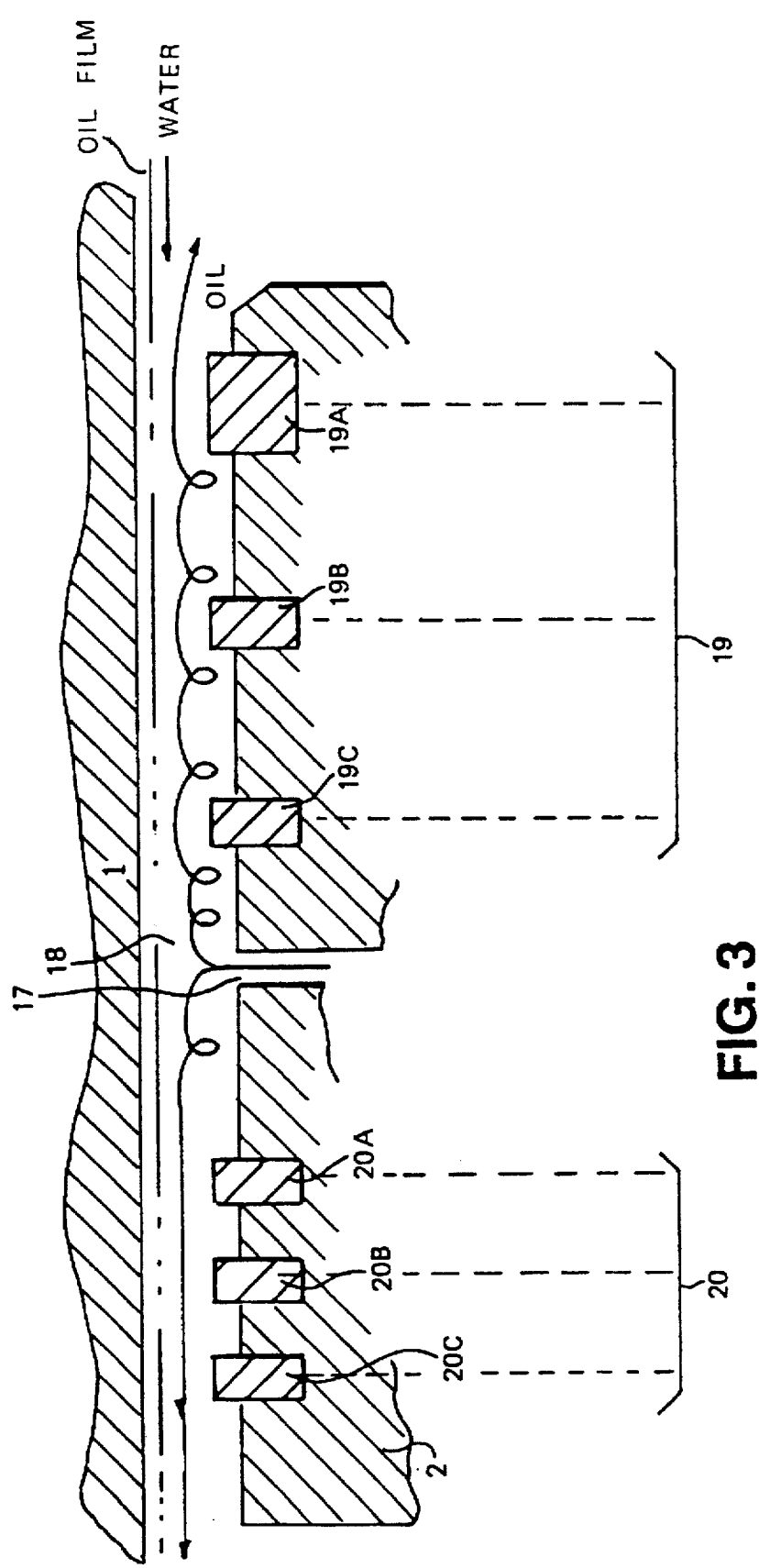
FIG. 3 is a fragmentary schematic sectional side view of sealing arrangements which can be incorporated in the piston pump of FIG. 1 or FIG. 2.

Reference is now made to FIG. 3, in which the inner seal ring group 20 comprises, instead of the two seal rings shown in FIG. 1 and the single ring of FIG. 2, three spaced seal assemblies 20A, 20B & 20C each having three seal rings in a single groove.

The outer seal ring group 19 again comprises an outermost seal 19A and two further seals 19B & 19C but one or more additional further seals could be employed.

The outermost seal 19A comprises two segmented ceramic rings installed in a common groove and the inner seals each comprise a groove receiving a single ring. The ceramic rings prevent penetration of particles present in the working fluid into the spaces behind the ceramic rings, to provide suitable operating conditions for the inner seals 19B and 19C. The ceramic seal rings allow satisfactory leakage across them of lubricant oil from the feed chamber 7.

The inner seal rings 19B and 19C have a combined scraping, oil distribution and sealing function. These rings can be of metal or suitable polymeric material, as can the rings of the inner group 20.

The rings 19B & 19C operate in a way similar to a labyrinth seal during the working or discharge stroke and significantly reduce the concentration of process fluid contamination in the lubricant oil flow. They allow the passage of sufficient lubricant for lubrication of the front ceramic rings 19A during the discharge stroke, and during the suction stroke, the rings provide an increased lubricant oil film thickness to adhere to the cylinder wall surface.

The inner seal ring group 20 is designed to minimise lubricant oil flow backwards into the feed chamber. Necessarily, process fluid that has leaked past the seal ring group 20 will sooner or later enter the feed chamber 7 by way of the pressure intensifier outlet port 17. An acceptable equilibrium is however reached between flow of lubricant oil with a small degree of contamination flowing into the feed chamber 7 and the lubricant oil flow going forward into the pressure intensifier chamber 12.

Figure 4:
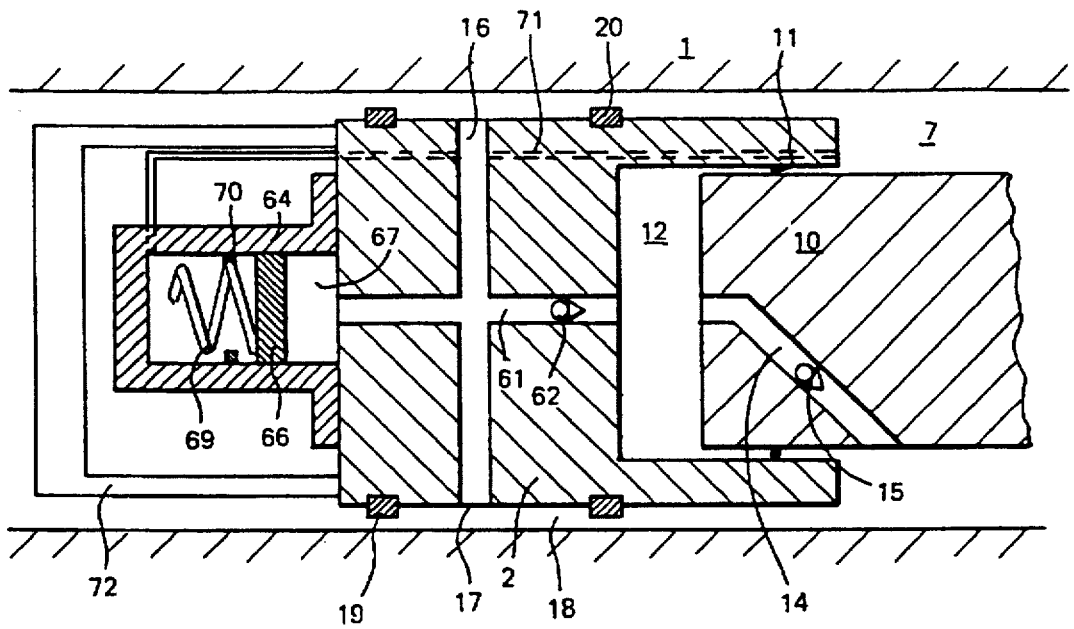
FIG. 4 is a partial sectional side view of a modified form of a piston pump in accordance with the present invention.

It will be evident from the description above of the overpressure or pressure intensifier mechanism operated by relative movement of the piston head 2 and the piston rod 5, that the pressure applied to the space between the seal ring groups 19 and 20 will vary over the cycle of operation of the piston pump. The pressure produced is low, or even non-existent, at the stroke end positions, and also during the initial parts of the discharge or compression and suction strokes. As shown in FIG. 4, the overpressure mechanism can incorporate an accumulator device to overcome this disadvantage.

In the mechanism of FIG. 4, the fluid in the chamber 12 between the piston head and the piston rod end portion 10 communicates with the space between the seal ring groups 19,20, here constituted by single rings only, by way of an axial passage 61 in the piston head from which the transverse passages 16 extend. The axial passage 61 includes a non-return valve 62, operating in the same sense as the non-return valve 15, between the chamber 12 and the transverse passages 16. The axial passage 61 extends beyond the transverse passages 16 into the interior of an accumulator cylinder 64 secured on the front face of the piston head 2.

An accumulator piston 66 is reciprocably movable within the cylinder 64 to define a variable volume accumulator chamber 67, communicating with the passage 61. The piston 66 is biassed to restrict the volume of the accumulator chamber 67 by a spring 69. Piston movement to enlarge the chamber is limited by a stop 70 within the cylinder. A passage 71 communicates the forward end of the accumulator cylinder 64 with the feed chamber 7 for return to the feed chamber of any lubricant oil which leaks past the piston 66. The accumulator cylinder 64 is enclosed within an accumulator housing 72 having a cylindrical wall closed by an end wall which functions as the working surface of the piston head 2.

Figure 5:
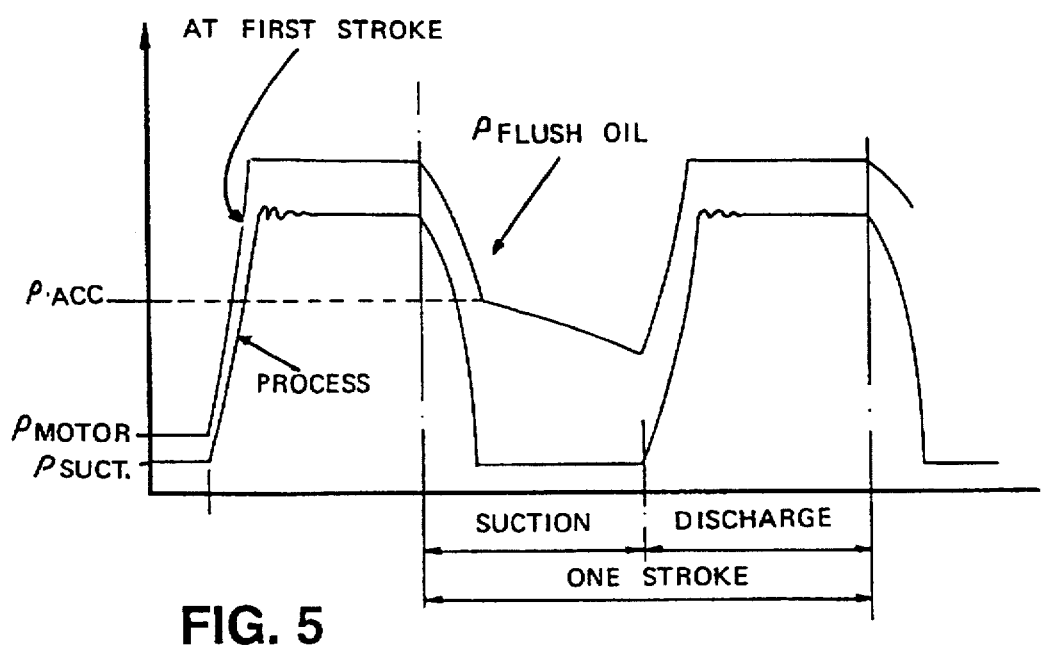
FIG. 5 graphically displays how pressures within the piston pump of FIG. 4 vary during a pumping stroke.

The operation of the accumulator device is illustrated in FIG. 5, which shows variations of the pressures in the accumulator chamber ($P_{ACC}$), the motor housing ($P_{MOTOR}$), and the process chamber ($P_{SUCT}$) through an initial stroke and a subsequent normal stroke. The accumulator chamber 67 is charged to a certain pressure level during the discharge stroke, the level being limited by the stop 70. When the pressure in the intensifier chamber 12 falls below that in the accumulator chamber, the non-return valve 62 closes and the accumulator pressure is supplied to the space between the seal rings or groups of rings 19,20, so as to reduce substantially the variations in the overpressure during the pumping cycle. The overpressure accumulator device can be employed with or without the multiple seals and barrier chamber arrangements of FIGS. 1–3.

The invention can of course be embodied in variety of ways other than as specifically described and illustrated.

I claim:

1. A sealing system for a piston pump comprising a piston rod (5) extending into a cylinder (1) from a motor housing (6), the motor housing containing drive means for reciprocably driving the piston rod, and the cylinder having a piston (2) reciprocable there within, the sealing system comprising a first seal means (19, 20) between the piston and the cylinder for separating a first fluid to be pumped by the piston from a second fluid around the piston rod, and second seal means (21A, 21B, 21C) between the piston rod and the cylinder separating the second fluid from a third fluid in the motor housing, wherein the second seal means comprises a first seal ring (21A), a second seal ring (21B) spaced from the first seal ring on the side thereof remote from the first seal means to define between the seal rings a first chamber (22), a third seal ring (216) spaced from second seal ring on the side thereof remote from the second seal ring to define a second chamber (27) between the second and third seal rings, means (25) for supplying a fourth fluid to the first chamber, and means (27) for maintaining a lower pressure within the second chamber than in the first.

2. A sealing system as claimed in claim 1, wherein the first seal means comprises first and second sealing means (19A–19C & 20A–20C) and wherein means (10–12, 14–17) is provided for generating a fluid pressure in the space between the first and second sealing means, the piston and the cylinder in excess of the fluid pressures at the outer sides of the first and second sealing means.

3. A sealing system as claimed in claim 1, wherein the means for maintaining a lower pressure in the second chamber (24) than in the first (22) comprise means (27) for evacuating or ventilating the second chamber.

4. A sealing system as claimed in claim 1, wherein the means for maintaining a lower pressure in the second chamber (24) than in the first comprise means for supplying the fourth fluid to the second chamber at a pressure lower than that of the fourth fluid supplied to the first chamber.

5. A sealing system as claimed in claim 4 wherein the fourth fluid is supplied to the first and second chambers (22,24) from a common source (40) through first piping (39) and is returned to the source from the second chamber through second piping (37).

6. A sealing system as claimed in claim 5 having means for measuring the quantity of the fourth fluid entering the fluid to be pumped by measuring the quantities flowing in the first and second piping (39,37).

7. A sealing system as claimed in claim 4, wherein the third and fourth fluids are the same and the fourth fluid is supplied to the second chamber (24) through a pressure reducing constriction (45) from the motor housing (6) or from a housing (35) for the pump.

8. A sealing system as claimed in claim 4, wherein the second and fourth fluids are the same and the second fluid is supplied to the space around the piston rod from the first chamber through a pressure reducing restriction (14).

9. A sealing system as claimed in claim 1 wherein the second and third fluids are the same.

10. A sealing system for sealing between a fluid-containing cylinder (1) and a piston reciprocably moveable therein, the system comprising first and second sealing means (19, 20) operative between the piston and the cylinder at positions spaced apart along the direction of reciprocable movement, a pressure chamber bounded by the first and the second sealing means, and means (10–12, 14–17) for generating a fluid pressure in the pressure chamber (18) between the first and second sealing means, the piston and the cylinder, in excess of the fluid pressures at the outer sides of the first and second sealing means characterised in that an least one of the first and second sealing means comprises a plurality of seal rings (19A–19C; 20A–20C) spaced apart along the direction of reciprocably movement.

11. A sealing system as claimed in claim 10, having an accumulator (64) in communication with the space (18) to regulate the pressure therein.

12. A sealing system as claimed in claim 11 wherein the first sealing means (19) comprises a plurality of seal rings (19A–19C) of which the first (19A) on the side thereof remote from the second sealing means (20) contacts a process or working fluid being moved by the piston member (2), the first seal ring is arranged to prevent or resist passage of particles in the working or process fluid towards the or each other seal ring of the first seal means.

13. A sealing system as claimed in claim 12 wherein the first seal ring (19A) is of ceramic.

14. A sealing system as claimed in claim 12 wherein the first seal ring (19A) comprises plural segmented ceramic rings in a single groove in the piston member and the or each other seal ring (19B,19C) comprises a single ring of metal or polymeric material.

15. A sealing system as claimed in claim 11, wherein the second sealing means (20) contacts lubricating oil on the side thereof remote from the first seal means (19) and comprises a plurality of seal rings (20A–20C) received in respective grooves in the piston member and spaced apart in the direction of reciprocable movement.

16. A sealing system for sealing between a fluid-containing cylinder (1) and a piston reciprocably movable therein, the system comprising first and second sealing means (19, 20) operative between the member and the cylinder at positions spaced apart along the direction of reciprocable movement, a pressure chamber bounded by the first and the second sealing means, and means (10–12, 14–17) for generating a fluid pressure in the pressure chamber (18) between the first and second sealing means, the member and the cylinder in excess of the fluid pressures at the outer sides of the first and second sealing means, characterised by an accumulator (64) in communication with the space (18) to regulate the pressure therein.

17. A sealing system as claimed in claim 16 wherein the accumulator (64) comprises a cylinder having a piston (66) movable therein, the piston dividing the cylinder interior into a first chamber (67) communicating with the space and a second chamber containing a spring biassing the piston.

18. A sealing system as claimed in claim 17 wherein the accumulator (64) is located at an end face of the piston and communicates with the space (18) by axially and radially extending passages.

19. A sealing system as claimed in claim 18 having a passage (71) communicating the second chamber through the end face of the piston remote from the accumulator.

20. A sealing system as claimed in claim 16 wherein the piston comprises relatively reciprocable first and second parts (2,10) having between them a variable valance cavity (12) communicating with the space, the excess pressure being generated by relative movement of the first and second parts, and wherein the accumulator (64) communicates with the cavity through a check valve (62) permitting fluid flow into the accumulator.

21. A sealing system as claimed in claim 20 wherein the first and second seal means are both carried by one (2) of the two relatively reciprocable members.

22. A sealing system as claimed in claim 20 wherein the first part (2) contacts a process or working fluid to be moved by the piston member and is driven by the second member (10).

23. A sealing system as claimed in claim 22 wherein the accumulator (64) is carried by the first part (2) at the side thereof contacting the process or working fluid.

* * * * *